Aug. 19, 1941.  L. M. PERSONS  2,252,946
THERMOSTAT
Filed Dec. 1, 1937
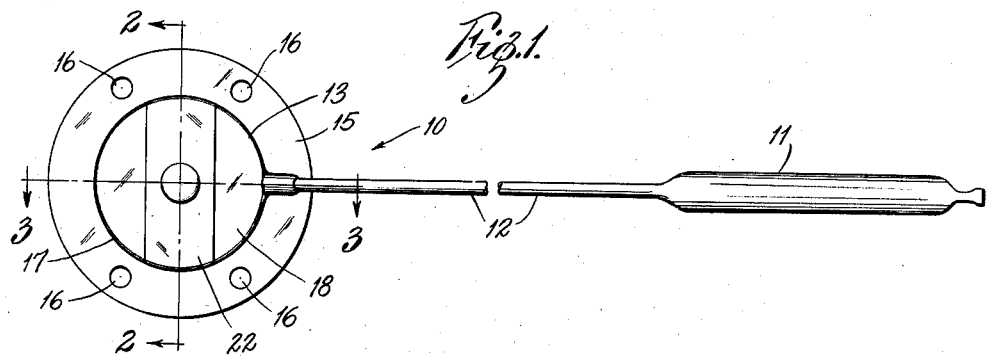
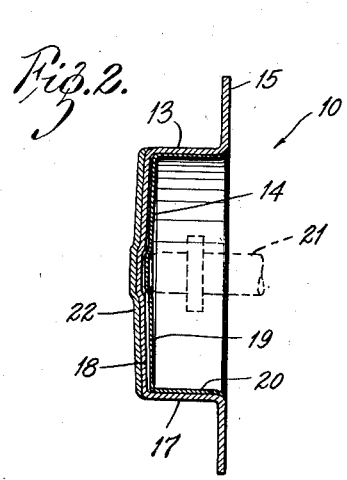
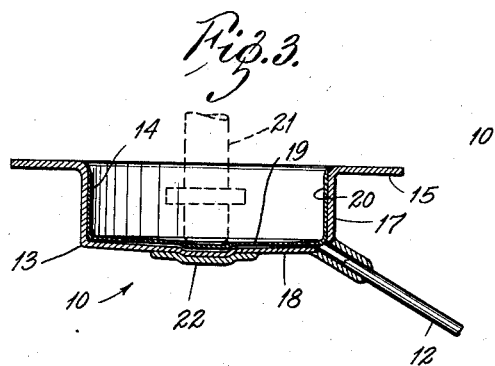
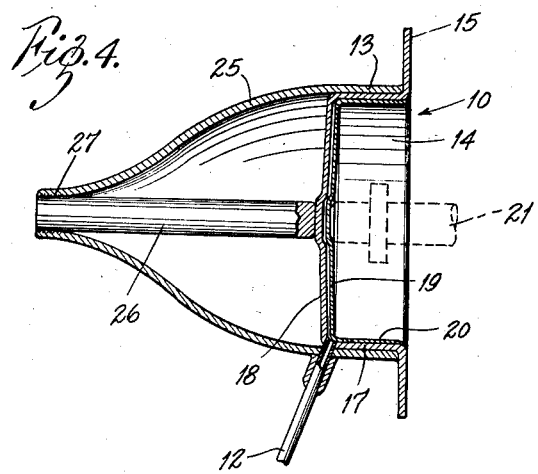
INVENTOR:
LAWRENCE M. PERSONS,
BY Lawrence C. Kingsland
ATTORNEYS Patented Aug. 19, 1941

2,252,946

UNITED STATES PATENT OFFICE 2,252,946

THERMOSTAT

Lawrence M. Persons, St. Louis County, Mo., assignor to Automatic Control Corporation, St. Louis, Mo., a corporation of Delaware Application December 1, 1937, Serial No. 177,406

2 Claims. (Cl. 297—3)

The present invention relates generally to thermostats, and more particularly to a compensating means for solid-charge thermostats.

It is well-known that ambient temperatures affect the operation of all types of thermostats. That is to say, the surrounding temperature in its rise and fall, due to weather or other conditions, contributes towards the functioning of thermostats. Various devices have been evolved prior to this time for effecting compensation for such action resultant of ambient temperatures, but such devices appertain generally to thermostats including bimetallic elements of various kinds. No thoroughly efficient compensating device has been evolved heretofore for use with a solid-charge thermostat, no satisfactory means being available for absorbing fluid expansion resultant of ambient temperature without moving the several parts of the switch or other device being operated by the thermostat.

Therefore, an object of the present invention is to provide novel compensating means in combination with a thermostat.

Another object is to provide means for absorbing the expansion of the fluid of a solid-charge thermostat resultant of ambient temperature which is effective to prevent movement of the diaphragm and switch parts, or the like, with which the thermostat is operatively associated, thereby eliminating inaccuracies of operation of the switch, or other device.

Another object is to provide a thermostat including a cup having compensating means adapted to reduce to a minimum movement of the associated diaphragm from causes other than expansion of the fluid due to the application of heat at the thermostat bulb.

Another object is to provide a simple and easily installed compensating means adapted to be used in combination with the cup of a solid-charge thermostat.

Other objects and advantages will be apparent from the following description, taken in conjunction with the accompanying drawing, in which:

Fig. 1 is a top view of a solid-charge thermostat incorporating a preferred modification of the present invention;

Fig. 2 is a section on the line 2—2 of Fig. 1;

Fig. 3 is a section on the line 3—3 of Fig. 1; and,

Fig. 4 is a section taken similarly to the section shown in Fig. 3 through a solid-charge thermostat incorporating another preferred modification of the present invention.

Referring to the drawing more particularly by reference numerals, Figs. 1–3 show a solid-charge thermostat generally designated 10 which includes a bulb 11, a tube 12, a cup 13, and a diaphragm 14. The cup 13 includes a conventional attaching flange 15 having the apertures 16 therein, an annular wall 17, and a circular face 18. The diaphragm 14 is of cup shape, including a circular face 19 and an annular wall 20, and is nested in the cup 13 (Figs. 2 and 3). An operated member 21 is shown disposed with one end abutting the inner side of the face 19 of the diaphragm 14 in the usual manner. A brass strip 22 of a configuration shown in Figs. 1–3 is welded or brazed to the outer side of the circular face 18 of the cup 13.

In Fig. 4 there is shown a second modification of the present invention. The several parts of the thermostat 10 are identical with the parts described above and are identified with the same reference numerals.

A pear-shaped member 25 is welded or otherwise fixed to the annular wall of the cup 13, the member 25 being of continuous construction, although a skeleton construction can be made to function. The pear-shaped member 25 is of brass, or of other material which readily expands upon the application of heat.

A steel pin or shaft 26 is fixed at one end to the narrow portion of the pear-shaped member 25, as by welding 27, and at the other end contacts the outer side of the face 18 of the cup 13. In constructing the modification shown in Fig. 4, the cup 13, the pear-shaped member 25, and the shaft 26 are assembled with the shaft 26 depressing the face 18 of the cup 13.

*Operation*

As has been pointed out above, the strip 22 is of brass, or of other expanding material, while the cup 13 is of steel, a material which expands relatively much less readily than brass. When the temperature around the cup 13, the diaphragm 14, and the adjacent portion of the tube 12 rises, the strip 22 expands and draws the circular face 18 of the cup 13 outwardly (to the left in Fig. 2) to permit the fluid between the cup 13 and diaphragm 14 to expand without moving the diaphragm 14, and, therethrough, the member 21, this expansion, of course, relating only to that expansion resultant of the ambient temperature rise. The actual movement of the circular face 18 of the cup 13 through the strip 22 is, of course, very slight, but it is sufficient to compensate the expanding fluid. It is clear that such a compensating device materially aids in an accurate operation of the associated electric switch, or the like.

Referring to Fig. 4, rise in the ambient temperature effects an expansion of the brass pear-shaped member 25, which moves to the left in those portions remote from the cup 13 and carries with it the shaft 26, thereby relieving the pressure applied to the circular face 18 of the cup 13 by the shaft 26 and permitting this circular face 18 of the cup 13 to expand (to the left in Fig. 4) through its inherent penned up resiliency. Expansion of the circular face 18 of the cup 13 permits the fluid between the cup 13 and the diaphragm 14 and within the adjacent portions of the tube 12 to expand without moving the diaphragm 14 and therethrough the member 21.

It is thus apparent that there has been provided compensating means for use in combination with a solid-charge thermostat which is thoroughly effective and efficient in producing a thermostat which has a high degree of accuracy for actuating a switch or other associated mechanism.

It is to be understood that the foregoing description and accompanying drawing have been given by way of illustration and example and not for purposes of limitation, the invention being limited only by the claims which follow.

What is claimed is:

1. In combination, a thermostat including a cup, a diaphragm within the cup, a pear-shaped member of expansible material fixed to the cup, and a shaft of material of a low coefficient of expansion fixed to the member and normally maintaining said cup under compression, said member and shaft comprising means to compensate for temperature changes in the medium surrounding the cup and diaphragm.

2. In combination, a thermostat including a cup and a diaphragm, a pear-shaped member fixed to the cup, the wide part of said member being contiguous to the wall of the cup, and a shaft fixed to said member at the latter's narrow part and bearing at its free end against the face of the cup to normally maintain said face under compression, said member having a greater coefficient of expansion than the shaft, said member and shaft being adapted to effect movement of the cup to compensate for change in volume of expansible medium within the cup and diaphragm due to changes in ambient temperature.

LAWRENCE M. PERSONS.